US009698591B2

United States Patent
Jiang

(10) Patent No.: US 9,698,591 B2
(45) Date of Patent: Jul. 4, 2017

(54) OVER-CURRENT PROTECTION METHOD AND CIRCUIT FOR A DC INVERTER

(71) Applicants: JOHNSON CONTROLS TECHNOLOGY COMPANY, Holland, MI (US); JOHNSON CONTROLS AIR CONDITIONING AND REFRIGERATION (WUXI) CO., LTD., Wuxi, Jiangsu (CN); YORK GUANGZHOU AIR CONDITIONING AND REFRIGERATION CO., LTD., Guangdong (CN)

(72) Inventor: Chenyi Jiang, Jiangsu (CN)

(73) Assignees: JOHNSON CONTROLS TECHNOLOGY COMPANY, Holland, MI (US); JOHNSON CONTROLS AIR CONDITIONING AND REFRIGERATION (WUXI) CO., LTD., Wuxi, Jiangsu (CN); YORK GUANGZHOU AIR CONDITIONING AND REFRIGERATION CO., LTD., Guangdong (CN)

( * ) Notice: Subject to any disclaimer, the term of this patent is extended or adjusted under 35 U.S.C. 154(b) by 235 days.

(21) Appl. No.: 14/706,284

(22) Filed: May 7, 2015

(65) Prior Publication Data
US 2016/0087419 A1   Mar. 24, 2016

(30) Foreign Application Priority Data
Sep. 23, 2014   (CN) .......................... 2014 1 0491960

(51) Int. Cl.
*H02H 3/08* (2006.01)
*H02H 7/122* (2006.01)
(Continued)

(52) U.S. Cl.
CPC .......... *H02H 7/1227* (2013.01); *H02H 3/006* (2013.01); *H02H 7/0811* (2013.01)

(58) Field of Classification Search
USPC .......................................................... 361/86
See application file for complete search history.

(56) References Cited

U.S. PATENT DOCUMENTS 7,113,376 B2 * 9/2006 Nomura ............... H02H 7/0833
   361/31
9,214,885 B1 * 12/2015 Glenn ................... H02P 29/027
(Continued)

Primary Examiner — Ronald W Leja

(57) ABSTRACT

An over-current protection method and circuit for a DC Inverter is provided in the present invention. Said over-current protection circuit comprises: a sampling unit for sampling output currents from a power module to form a sampling signal; a signal-processing unit for amplifying with various magnification factors and low-pass filtering the sampling signal to generate a first over-current signal and a second over-current signal; a signal-generating unit for generating a first interrupt trigger signal based on the first over-current signal; a comparison unit for comparing the second over-current signal with a reference voltage corresponding to an over-current threshold of a motor, with a comparison result being a second interrupt trigger signal; and a control unit for controlling the power module based on the first interrupt trigger signal, and the motor based on the second interrupt trigger signal. The over-current protection method and circuit provided in the present invention are able to satisfy over-current protection of the power module and the motor of the inverter simultaneously.

10 Claims, 2 Drawing Sheets

Figure 1:
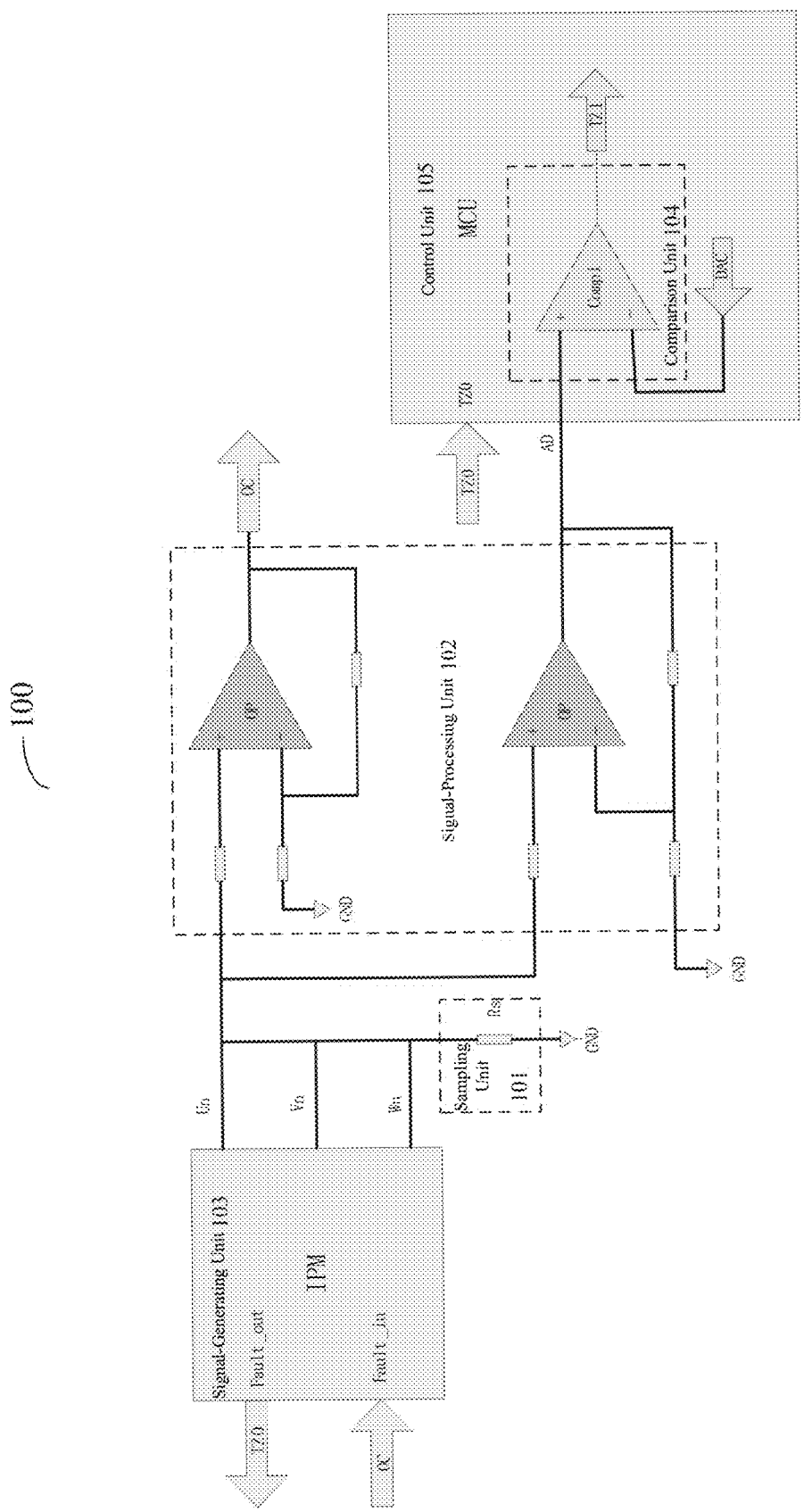

(51) Int. Cl.
*H02H 3/00*     (2006.01)
*H02H 7/08*     (2006.01)

(56) References Cited

U.S. PATENT DOCUMENTS

| | | | |
|---|---|---|---|
| 2005/0179416 A1* | 8/2005 | Iribe | B25J 9/1674 318/563 |
| 2010/0027170 A1* | 2/2010 | Kishimoto | H02P 29/032 361/31 |
| 2011/0228433 A1* | 9/2011 | Tsai | H02H 3/08 361/86 |
| 2011/0254489 A1* | 10/2011 | Greetham | H02P 6/14 318/400.14 |
| 2014/0021893 A1* | 1/2014 | Komatsu | H02H 3/08 318/400.22 |
| 2015/0295488 A1* | 10/2015 | Shen | H02H 3/006 363/50 |
| 2016/0087419 A1* | 3/2016 | Jiang | H02H 3/006 361/86 |

\* cited by examiner

OVER-CURRENT PROTECTION METHOD AND CIRCUIT FOR A DC INVERTER

TECHNICAL FIELD

The present invention involves the technical field of over-current protection, in particular an over-current protection method and circuit for a DC Inverter.

BACKGROUND

A traditional over-current protection method is merely able to configure a fixed over-current protection threshold by voltage-division of an external resistance, and said protection threshold usually is not in a position to take account of current protection values of a power module and a motor of an inverter simultaneously. For instance, where an over-current protection threshold configured by the inverter is the current protection value of the power module of the inverter, and the current protection value of the power module is greater than the current protection value of the motor, over-current protection of the motor is a mere software protection; where the over-current protection threshold configured by the inverter is the current protection of the motor, and the current protection value of the power module is greater than the current protection value of the motor, the over-current protection value of the motor is not able to be dynamically changed by software. In addition, where other motors with equal powers are used instead, due to discrepancy in current protection values of the motors, it is required to adjust an inverter hardware circuit to change the over-current protection threshold.

CONTENT OF INVENTION

Aiming at the deficiencies of existing technologies, on one hand, the present invention provides an over-current protection method for a DC Inverter. Said over-current protection method comprises: sampling output currents from a power module to form a sampling signal; amplifying with various magnification factors and low-pass filtering said sampling signal to generate a first over-current signal and a second over-current signal, wherein the magnification factor, on the basis of which said first over-current signal is generated, is pertinent to an over-current threshold of said power module, and the magnification factor, on the basis of which said second over-current signal is generated, is pertinent to an over-current threshold of a motor; generating a first interrupt trigger signal based on said first over-current signal; comparing said second over-current signal with a reference voltage corresponding to said over-current threshold of the motor, with a comparison result being a second interrupt trigger signal; controlling said power module based on said first interrupt trigger signal; and controlling said motor based on said second interrupt trigger signal.

In one of the embodiments of the present invention, said over-current threshold of the motor is dynamically adjustable.

On the other hand, the present invention also provides an over-current protection circuit for a DC Inverter. Said over-current protection circuit comprises: a sampling unit for sampling output currents from a power module to form a sampling signal; a signal-processing unit for amplifying with various magnification factors and low-pass filtering said sampling signal to generate a first over-current signal and a second over-current signal, wherein the magnification factor, on the basis of which said first over-current signal is generated, is pertinent to an over-current threshold of said power module, and the magnification factor, on the basis of which said second over-current signal is generated, is pertinent to an over-current threshold of a motor; a signal-generating unit for generating a first interrupt trigger signal based on said first over-current signal; a comparison unit for comparing said second over-current signal with a reference voltage corresponding to said over-current threshold of the motor, with a comparison result being a second interrupt trigger signal; and a control unit for controlling said power module based on said first interrupt trigger signal, and said motor based on said second interrupt trigger signal.

In one of the embodiments of the present invention, said over-current threshold of the motor is obtained via digital-to-analog conversion after calculation by said control unit on the basis of specifications and running states of said motor.

In one of the embodiments of the present invention, a digital-to-analog converter used for said digital-to-analog conversion is comprised inside said control unit.

In one of the embodiments of the present invention, said comparison unit is comprised inside said control unit.

In one of the embodiments of the present invention, dynamic adjustability of said over-current threshold of the motor is realized by a duty ratio generated from a pulse-width modulation output of said control unit together with a resistance-capacitance low-pass filter circuit.

In one of the embodiments of the present invention, said sampling unit comprises a sampling resistance.

In one of the embodiments of the present invention, said signal-processing unit comprises an operational amplifier and a low-pass filter, and said operational amplifier is a Non-Inverting amplifier.

In one of the embodiments of the present invention, said signal-generating unit is said power module.

The over-current protection method and circuit provided in the present invention are in a position to satisfy over-current protection of the power module and the motor of the inverter simultaneously.

ILLUSTRATIONS OF FIGURES

The following figures are a part of the present invention and for understanding the present invention. The embodiments and their descriptions are indicated in the figures to explain the principle of the present invention.

Figure 2:
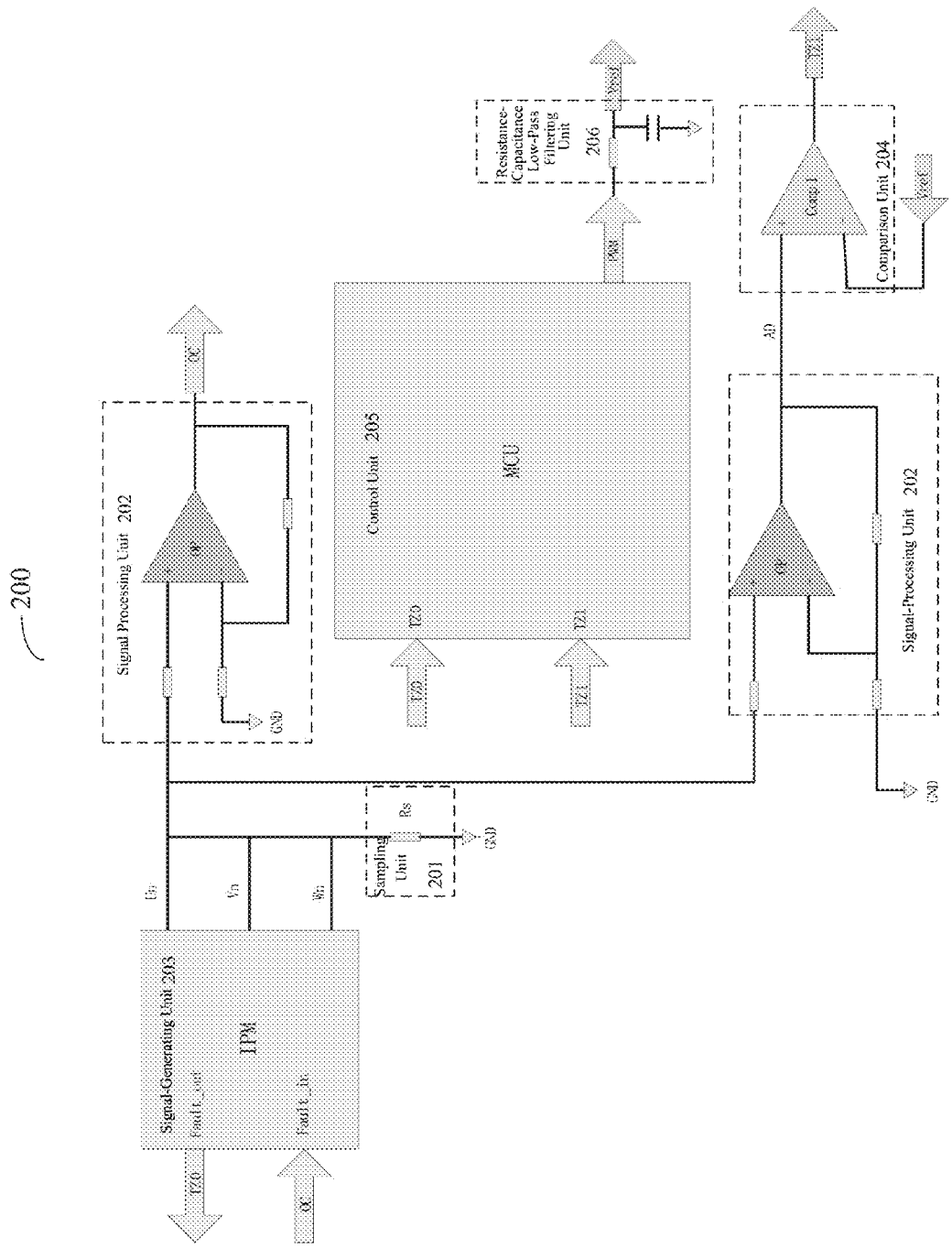

In figures:

FIG. 1 indicates an over-current protection circuit for a DC Inverter according to one of the embodiments of the present invention; and FIG. 2 indicates an over-current protection circuit for a DC Inverter according to another embodiment of the present invention.

SPECIFIC DESCRIPTIONS OF EMBODIMENTS

In the descriptions of the following paragraphs, plenty of details are provided to enable in-depth understanding of the present invention. However, it is obvious for those skilled in art that the present invention is able to be implemented without one or more details of such. In other examples, to avoid confusion with the present invention, some technical features known to the public in this field are not described.

It should be understood that the present invention is able to be implemented in different forms rather than limiting to the embodiments put forward herein. On the contrary, the provision of such embodiments will result in thorough and complete disclosure and complete transmission of the scope of the present invention to those skilled in art.

Some terms used herein are only for describing the details of the embodiments rather than exerting limitations to the present invention. For use herein, the singular form of "a/an", "one" and "said/the" intents to include plural form unless they are defined otherwise in the context explicitly. In addition, it also need to be clarified that the terms "compose(s)" and/or "comprise(s)" used in said descriptions are to ascertain existence of said feature, integral number, step, operation, component and/or part, but existence or addition of one or more other features, integral numbers, steps, operations, components, parts and/or group should not be excluded. For use herein, the term "and/or" comprises any and all combinations of pertinent items listed.

For thorough understanding of the present invention, the detailed steps and structures will be put forward in the following descriptions to explain the technical solution of the present invention. The preferred embodiment of the present invention is described in detail as follows. Nevertheless, apart from such detailed descriptions, the present invention is able to be implemented otherwise.

Generally, for a DC Inverter with certain level of power, the over-current protection threshold of a hardware power module is fixed. Said threshold is usually greater than a motor over-current protection threshold so as to protect the hardware of the inverter itself Motors from various manufacturers having the same power level may have obvious different over-current protection thresholds. Therefore, it is hard to take account of current protection values of the power module and the motor of the inverter simultaneously.

The present invention provides an over-current protection method for a DC Inverter. Said over-current protection method comprises: sampling output currents from a power module to form a sampling signal; amplifying with various magnification factors and low-pass filtering the sampling signal to generate a first over-current signal and a second over-current signal, wherein the magnification factor, on the basis of which the first over-current signal is generated, is pertinent to an over-current threshold of the power module, and the magnification factor, on the basis of which the second over-current signal is generated, is pertinent to an over-current threshold of the motor; generating a first interrupt trigger signal based on the first over-current signal; comparing the second over-current signal with a reference voltage corresponding to the over-current threshold of the motor, with a comparison result being a second interrupt trigger signal; controlling the power module based on the first interrupt trigger signal; and controlling said motor based on the second interrupt trigger signal.

Preferably, said over-current threshold of the motor is dynamically adjustable on the basis of specifications and running states of the motor.

With the aforesaid over-current protection method provided in the present invention, dynamic adjustment of the over-current threshold of the inverter is able to be realized, and over-current protection of the power module and the motor of the inverter can be satisfied simultaneously.

In order to implement the aforesaid method, the present invention also provides an over-current protection circuit for a DC Inverter. FIG. 1 indicates an Over-current Protection Circuit 100 for a DC Inverter in accordance with one of the embodiments in the present invention. As shown in FIG. 1, the Over-Current Protection circuit 100 comprises a Sampling Unit 101, a Signal-Processing Unit 102, a Signal-Generating Unit 103, a Comparison Unit 104 and a Control Unit 105, wherein the Sampling Unit 101 is for sampling output currents from a power module to form a sampling signal; the Signal-Processing Unit 102 is for amplifying with various magnification factors and low-pass filtering said sampling signal to generate a first over-current signal and a second over-current signal, wherein the magnification factor, on the basis of which the first over-current signal is generated, is pertinent to an over-current threshold of the power module, and the magnification factor, on the basis of which the second over-current signal is generated, is pertinent to an over-current threshold of a motor; the Signal-Generating Unit 103 is for generating a first interrupt trigger signal based on the first over-current signal; the Comparison Unit 104 is for comparing the second over-current signal with a reference voltage corresponding to the over-current threshold of the motor, with a comparison result being a second interrupt trigger signal; and the Control Unit 105 is for controlling the power module based on the first interrupt trigger signal, and the motor based on the second interrupt trigger signal.

Specifically, the Sampling Unit 101 is able to comprise a sampling resistance Rs, one end of which is connected to the output of a three-phase down-bridge of the power module, and the other end is connected to the ground. In FIG. 1, the power module is indicated as an Intelligent Power Module (IPM). IPM is an advanced power switch component having the merits of high current density, low saturation voltage and high-voltage tolerance of a high power transistor as well as the advantages of high input impedance, high switch frequency and low drive power of a field effect transistor. In addition, IPM internally integrates circuits for logic, control, detection and protection, which facilitates the use, and not only reduces volume of the system and shorten development period, but also improve stability of the system.

According to one of the embodiments in the present invention, the Signal-Processing Unit 102 is able to comprise an operational amplifier OP and a low-pass filter, and the operational amplifier OP is a Non-Inverting degenerative feedback amplifier. The operational amplifier OP is able to comprise a first operational amplifier and a second operational amplifier, wherein the magnification factor of the first operational amplifier depends on the factor between the malfunction trigger voltage of the power module corresponding to the over-current threshold of the power module and the output voltage of the Sampling Unit 101; the magnification factor of the second operational amplifier depends on the factor between the voltage corresponding to the over-current threshold of the motor and the output voltage of the sampling unit 101. The signals sampled by the Sampling Unit 101 are able to pass through the first operational amplifier and the second operational amplifier respectively and both through the low-pass filter to form the first over-current signal (indicated as OC in FIG. 1) and the second over-current signal respectively. The first over-current signal is able to be used for over-current protection of the power component of a DC Inverter, and the second over-current signal is able to be used for over-current protection of the motor.

In accordance with one of the embodiments in the present invention, the Signal-Generating Unit 103 is able to be the power module IPM itself. The power module, based on the first over-current signal, is able to output a malfunction signal acting as the first interrupt trigger signal (indicated as TZ0 in FIG. 1). Preferably, the power module is in a position to integrate other types of protection inside the module to output a malfunction signal. Other types of protection include under-voltage protection, over-heat protection and short circuit protection, etc.

According to one of the embodiments in the present invention, the Comparison Unit 104 is able to be comprised inside the Control Unit 105. The Control Unit 105 is able to be a processor (indicated as Micro Controller Unit in FIG. 1, MCU), and the Comparison Unit 104 is able to be, for example a comparer inside the Control Unit. In this way, there is no need to add an external comparer, by which the cost of hardware is lowered and the flexibility in designing over-current protection is increased.

In accordance with one of the embodiments in the present invention, the over-current threshold of the motor is obtained via digital-to-analog conversion after calculation by the Control Unit 105 on the basis of specifications and running states of the motor. The over-current threshold of the motor is able to be fixed or dynamically adjustable. The Control Unit 105 is in a position to calculate the over-current threshold on the basis of specifications and running states of the motor, and then via digital-to-analog conversion generate an analogue over-current threshold of the motor acting as an input signal of a negative end of the Comparison Unit 104 and is compared with the second over-current signal as an input signal of a positive end, and the comparison result becomes the second interrupt trigger signal (indicated as TZ1 in FIG. 1). The Control Unit 105 is able to provide interrupt protection for the power module and the motor respectively based on the first interrupt trigger signal TZ0 and the second interrupt trigger signal TZ1.

Preferably, the digital-to-analog converter used for digital-to-analog conversion is able to be comprised inside the Control Unit 105. The use of the digital-to-analog converter inside the Control Unit 105 is in a position to lower the cost of hardware.

Specifically, as shown in FIG. 1 the working principle of the Over-Current Protection Circuit 100 for a DC Inverter is as follows:

A DC Inverter is able to sample an output current from the three-phase down-bridge of the power module IPM (the amplitudes of its output voltage and current reflect linear relationship), and through the sampling resistance Rs of the Sampling Unit 101, magnify the sampling signal via the first operational amplifier OP, wherein the magnification factor is able to be designed according to the relationship that the over-current threshold of the power module corresponds to the malfunction trigger voltage of the power module IPM. Then, the first over-current signal OC is generated after interfering signals are filtered by the filter, and input into the power module IPM. The power module IPM is able to integrate other types of protection inside the module (for instance under-voltage protection, etc.) to output a malfunction signal TZ0, and the malfunction signal acts as the first interrupt trigger signal TZ0 of the Control Unit 105 MCU. Where over-current state arises outside, the signal will generate a falling edge and accordingly processor software protection interrupt of the Control Unit 105 is triggered to realize over-current protection of the power module IPM.

At the same time, with signal conditioning and low-pass filtering via the second operational amplifier OP, a voltage signal corresponding to the current sampling generates the second over-current signal acting as an input signal for Analog-to-Digital Conversion (ADC) of the Control Unit 105, and an analog quantity input signal of this channel acts as an input signal of the positive end of the comparator inside the processor (indicated as Comp1 in FIG. 1). An input signal of the negative end of the comparator is able to be generated by the output of Digital-to-Analog Conversion (DAC) inside the processor. According to the different specifications and running states, the software of a DC Inverter is in a position to calculate the corresponding over-current protection value of the motor (a fixed value or a varied value) acting as an input of the aforesaid DAC to realize over-current protection of the motor.

FIG. 2 indicates an Over-Current Protection Circuit 200 for a DC Inverter according to another embodiment in the present invention. As shown in FIG. 2, the Over-Current Protection Circuit 200 has similar structures as the Over-Current Protection Circuit 100, while the difference is that a Comparison Unit 204 is not comprised inside a Control Unit 205, and the Over-Current Protection Circuit 200 comprises a Resistance-Capacitance Low-Pass Filtering Unit 206. Therefore, for succinct description, the descriptions of the structures identical with the Over-Current Protection Circuit 100 are omitted.

In the Over-Current Protection Circuit 200 as shown in FIG. 2, the Comparison Unit 204 is realized by using an external comparator chip and is in a position to cope with the application where the processor of the Control Unit 205 has no comparator and DAC function. At the same time, dynamic adjustability of the over-current threshold of the motor is realized by a duty ratio generated from a Pulse-Width Modulation (PWM) output of the Control Unit 205 together with the Resistance-capacitance Low-Pass Filtering Unit 206.

Specifically, a reference voltage value corresponding to the over-current threshold of the motor is able to be generated by a duty ratio from a Pulse-Width Modulation (PWM) output of the processor of the Control Unit 205 together with the Resistance-Capacitance Low-Pass Filtering Unit 206, and the reference voltage acts as a reference voltage of the Comparison Unit 204.

Since the change of duty ratio of PWM signal is able to be realized by software of the processor and there is no need to change hardware, the reference voltage of the Comparison Unit 204 is dynamically adjustable. With respect to different motors, if over-current thresholds are different, only the magnitude of PWM duty ratio needs to be changed. In addition, where the same motor is run under different operation conditions or states, dynamic adjustment of the protection threshold is able to be realized by changing PWM duty ratio as well for more efficient protection of the motor.

With the over-current protection circuit provided in the present invention, it is able to realize dynamic adjustment of the over-current threshold of the inverter and satisfy over-current protection of the power module and the motor of the inverter simultaneously.

The present invention has been explained by the aforesaid embodiments. However, it should be understood that the foresaid embodiments are only used for illustration and explanation rather than limiting the present invention to the scopes of the embodiments described. In addition, those skilled in art are in a position to understand that the present invention is not limited to the aforesaid embodiments, and there can be more variants and modifications according to the instructions of the present invention, and the variants and modifications all fall into the protection scope of the present invention. The protection scope of the present invention is defined by the affiliated claims and equal scopes thereof.

The invention claimed is:

1. An over-current protection method for a DC Inverter, wherein said over-current protection method comprises:
    sampling output currents from a power module to form a sampled signal;
    amplifying with a plurality of magnification factors and low-pass filtering said sampling signal to generate a first over-current signal and a second over-current signal, wherein a first magnification factor, on the basis of which said first over-current signal is generated, is pertinent to an over-current threshold of said power module, and a second magnification factor, on the basis of which said second over-current signal is generated, is pertinent to an over-current threshold of a motor;

generating a first interrupt trigger signal based on said first over-current signal;

comparing said second over-current signal with a reference voltage corresponding to said over-current threshold of the motor, with a comparison result being a second interrupt trigger signal;

controlling said power module based on said first interrupt trigger signal; and controlling said motor based on said second interrupt trigger signal.

2. The over-current protection method as defined in claim 1, wherein said over-current threshold of the motor is dynamically adjustable.

3. An over-current protection circuit for a DC Inverter, wherein said over-current protection circuit comprises:

a sampling unit for sampling output currents from a power module to form a sampling signal;

a signal-processing unit for amplifying with a plurality of magnification factors and low-pass filtering said sampling signal to generate a first over-current signal and a second over-current signal, wherein a first magnification factor, on the basis of which said first over-current signal is generated, is pertinent to an over-current threshold of said power module, and a second magnification factor, on the basis of which said second over-current signal is generated, is pertinent to an over-current threshold of a motor;

a signal-generating unit for generating a first interrupt trigger signal based on said first over-current signal;

a comparison unit for comparing said second over-current signal with a reference voltage corresponding to said over-current threshold of the motor, with a comparison result being a second interrupt trigger signal; and a control unit for controlling said power module based on said first interrupt trigger signal, and said motor based on said second interrupt trigger signal.

4. The over-current protection circuit as defined in claim 3, wherein said over-current threshold of the motor is obtained via digital-to-analog conversion after calculation by said control unit on the basis of specifications and running states of said motor.

5. The over-current protection circuit as defined in claim 4, wherein a digital-to-analog converter used for said digital-to-analog conversion is comprised inside said control unit.

6. The over-current circuit as defined in claim 3, wherein said comparison unit is comprised inside said control unit.

7. The over-current circuit as defined in claim 3, wherein dynamic adjustability of said over-current threshold of the motor is realized by a duty ratio generated from a pulse-width modulation output of said control unit together with a resistance-capacitance low-pass filter circuit.

8. The over-current protection circuit as defined in claim 3, wherein said sampling unit comprises a sampling resistance.

9. The over-current protection circuit as defined in claim 3, wherein said signal-processing unit comprises an operational amplifier and a low-pass filter, and said operational amplifier is a non-inverting amplifier.

10. The over-current circuit as defined in claim 3, wherein said signal-generating unit is said power module.

* * * * *